(12) United States Patent
Yun

(10) Patent No.: US 11,618,425 B2
(45) Date of Patent: Apr. 4, 2023

(54) ELECTROMECHANICAL BRAKING APPARATUS

(71) Applicant: HYUNDAI MOBIS CO., LTD., Seoul (KR)

(72) Inventor: Seung Hyun Yun, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 188 days.

(21) Appl. No.: 17/156,996

(22) Filed: Jan. 25, 2021

(65) Prior Publication Data
US 2021/0253076 A1 Aug. 19, 2021

(30) Foreign Application Priority Data
Feb. 19, 2020 (KR) .................. 10-2020-0020461

(51) Int. Cl.
*B60T 13/74* (2006.01)
*B60T 13/14* (2006.01)

(52) U.S. Cl.
CPC .......... *B60T 13/745* (2013.01); *B60T 13/142* (2013.01); *B60T 13/746* (2013.01)

(58) Field of Classification Search
CPC ..... B60T 13/745; B60T 13/746; B60T 13/142
See application file for complete search history.

(56) References Cited

U.S. PATENT DOCUMENTS

| | | | |
|---|---|---|---|
| 5,094,079 A * | 3/1992 | Leigh-Monstevens | B60T 13/66 60/545 |
| 6,574,959 B2 * | 6/2003 | Fulks | B60T 13/745 60/545 |
| 8,387,381 B2 * | 3/2013 | Ohno | B60T 13/746 60/545 |
| 8,555,634 B2 * | 10/2013 | Ohno | B60T 13/746 60/545 |
| 9,440,629 B2 * | 9/2016 | Ohnishi | B60T 17/088 |
| 10,604,131 B2 * | 3/2020 | Bieltz | H02P 29/028 |
| 11,072,316 B2 * | 7/2021 | Bach | B60T 11/18 |
| 11,285,931 B2 * | 3/2022 | Lee | B60T 13/745 |
| 2009/0217659 A1 * | 9/2009 | Ohno | B60T 13/746 60/545 |
| 2010/0275593 A1 * | 11/2010 | Okada | B60T 13/162 60/545 |
| 2014/0090371 A1 * | 4/2014 | Yoshizu | B60T 13/745 60/545 |
| 2019/0092298 A1 * | 3/2019 | Bach | B60T 7/04 |
| 2020/0017093 A1 * | 1/2020 | Bieltz | B60T 13/143 |

* cited by examiner

*Primary Examiner* — Thomas E Lazo
(74) *Attorney, Agent, or Firm* — NovoTechIP International PLLC

(57) ABSTRACT

The present disclosure in at least one embodiment provides a braking apparatus including a rod configured to translate in response to a depression of a brake pedal, a master cylinder configured to receive brake oil and to be responsive to insertion of the rod for discharging brake oil contained, a motor, a gear mechanism having at least some part connected to the master cylinder and at least some other part connected to the motor, and a securing member which includes a gear-side joint configured in at least some part of the securing member to be fastened to the gear mechanism and the master cylinder, and a motor-side joint configured in at least some other part of the securing member to be fastened to the motor.

7 Claims, 3 Drawing Sheets

ELECTROMECHANICAL BRAKING APPARATUS

CROSS-REFERENCE TO RELATED APPLICATION

This application is based on, and claims priority from, Korean Patent Application Number 10-2020-0020461, filed Feb. 19, 2020, the disclosure of which is incorporated by reference herein in its entirety.

TECHNICAL FIELD

The present disclosure in at least one embodiment relates to an electromechanical braking apparatus.

BACKGROUND

The statements in this section merely provide background information related to the present disclosure and do not necessarily constitute prior art.

In a running vehicle, the driver's brake-pedal depression alone may be short of applying sufficient braking force to stop the vehicle. Therefore, a booster is used to boost the pedal effort of the driver. Types of boosters include vacuum boosters, hydraulic boosters, and electromechanical boosters.

The vacuum booster is a booster with a generally vacuous interior, which lets air sucked in when the driver presses the brake pedal to boost the pedal effort.

The hydraulic booster provides boosting power by applying hydraulic pressure to the hydraulic fluid by using a motor and a pump.

The electromechanical booster includes a motor and a gear mechanism configured to transmit a driving force generated by the motor. The gear mechanism provides a boost by pressing a master cylinder plunger.

The conventional electromechanical booster has the gear mechanism partially bolted to the motor for their fixation. Once fastened together in that way, the gear mechanism suffers from a shortened durability life due to continuous exposure to vibration generated by the motor. Additionally, the motor vibration leads to noise issues generated due to a gap or clearance existing in the bolted parts.

SUMMARY

According to at least one embodiment, the present disclosure provides an electromechanical braking apparatus including a rod, a master cylinder, a motor, a gear mechanism, and a securing member. The rod is configured to translate in response to a depression of a brake pedal. The master cylinder is configured to receive brake oil and to be responsive to the insertion of the rod for discharging the brake oil. The gear mechanism has at least some part connected to the master cylinder and at least some other part connected to the motor. The securing member includes a gear-side joint and a motor-side joint. The gear-side joint is configured in at least some part of the securing member to be fastened to the gear mechanism and the master cylinder. The motor-side joint is configured in at least some other part of the securing member to be fastened to the motor.

Figure 1:
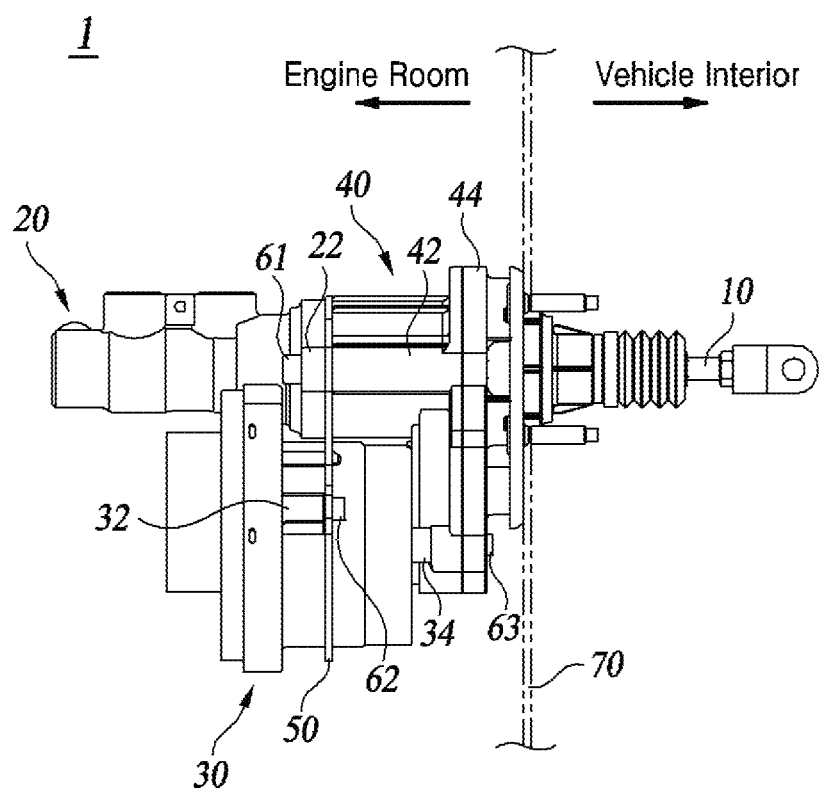
FIG. 1 is a side view of an electromechanical braking apparatus according to at least one embodiment of the present disclosure.

| REFERENCE NUMERALS | |
|---|---|
| 1: braking apparatus | 10: rod |
| 20: master cylinder | 30: motor |
| 40: gear mechanism | 50: securing member |

DETAILED DESCRIPTION

Accordingly, the present disclosure in at least one embodiment seeks to provide an electromechanical braking apparatus capable of noise reduction with excellent durability.

Some exemplary embodiments of the present disclosure are described below with reference to the accompanying drawings. In the following description, like reference numerals preferably designate like elements, although the elements are shown in different drawings. Further, in the following description of some embodiments, a detailed description of known functions and configurations incorporated herein will be omitted for the purpose of clarity and for brevity.

Additionally, alphanumeric codes such as first, second, i), ii), a), b), etc., in numbering components are used solely for the purpose of differentiating one component from the other but not to imply or suggest the substances, the order, or sequence of the components. Throughout this specification, when a part "includes" or "comprises" a component, the part is meant to further include other components, not excluding thereof unless there is a particular description contrary thereto.

The present disclosure provides a braking apparatus 1 with a gear mechanism 40 having a plurality of gears, screws, and nuts, the configuration and arrangement of which, however, are generally known to those skilled in the art, and the illustration and description of the internal structural details of the braking apparatus 1 other than the fastening structure thereof will be omitted.

Additionally, in the present disclosure, each of the joints is shown as being bolted but is not limited thereto. For example, each of the joints may be fastened by using a spring clip or a rivet.

It should be noted that a and b included in the reference numerals in the present disclosure are just subscripts for distinguishing left and right, and even if both side portions are distinguished by a and b, they share the same shape and configuration by the common numerical parts in the reference numerals. It should also be noted that either one of a and b being illustrated in the drawings is for convenience of description and concise illustration and that the illustration of one of a and b alone assumes the inclusion of the other, which can be implemented without difficulty by a person skilled in the art.

Figure 2:
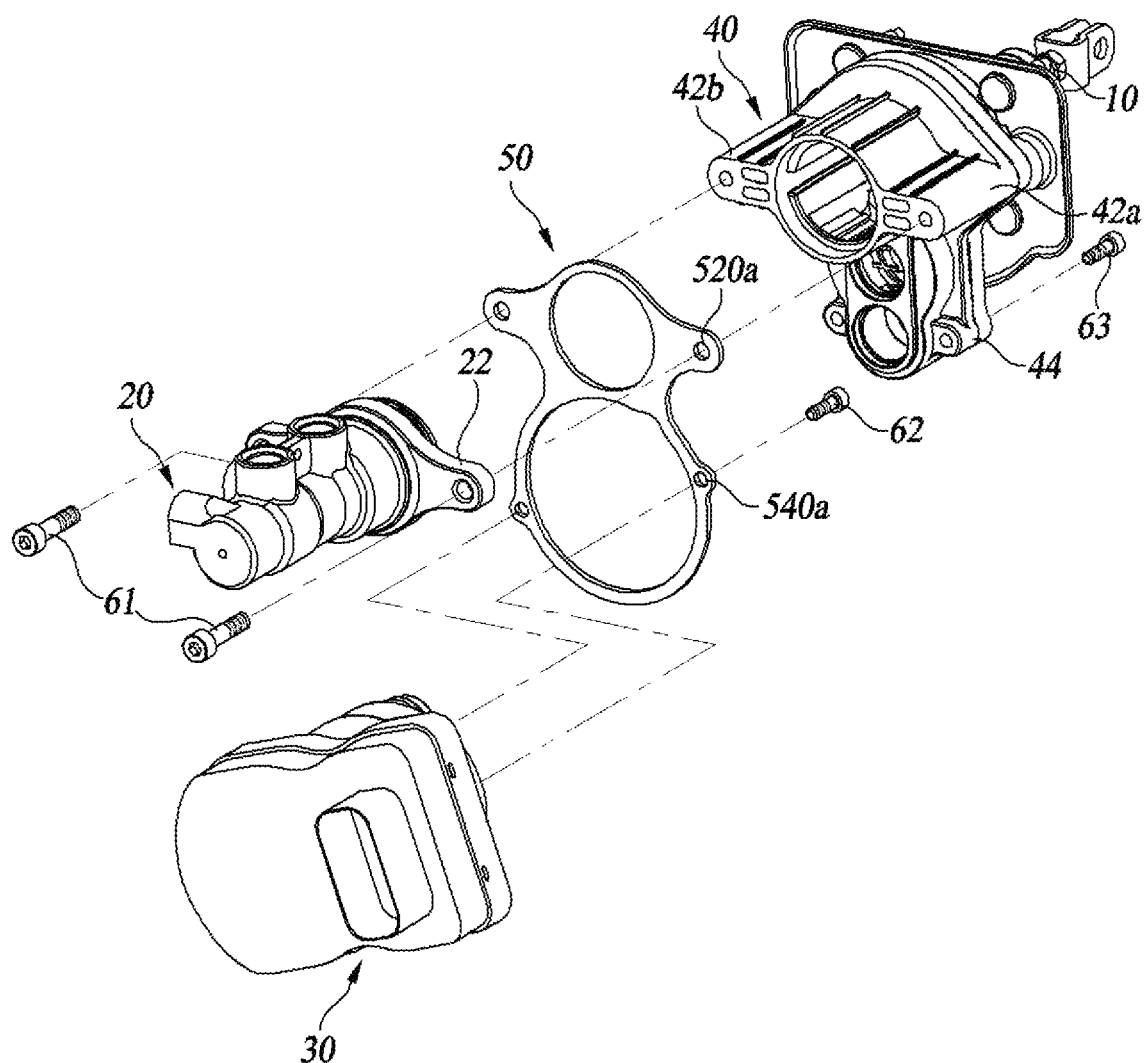
FIG. 2 is an exploded perspective view of an electromechanical braking apparatus according to at least one embodiment of the present disclosure.

FIG. 1 is a side view of an electromechanical braking apparatus according to at least one embodiment of the present disclosure. FIG. 2 is an exploded perspective view of an electromechanical braking apparatus according to at least one embodiment of the present disclosure.

As shown in FIGS. 1 and 2, the electromechanical braking apparatus 1 according to at least one embodiment of the present disclosure includes all or some of a rod 10, a master cylinder 20, a motor 30, the gear mechanism 40, and a securing member 50.

The rod 10 has one end connected to a brake pedal (not shown) and is configured to perform, when the vehicle driver depresses the brake pedal, translational movement in response to the amount of depression or a stroke on the brake pedal. The rod 10 has the other end connected to at least a part of the master cylinder 20, so that hydraulic pressure may be generated in the brake oil provided inside the master cylinder 20. When the driver depresses the brake pedal, the rod 10 transmits the pedal effort to a piston (not shown) of the master cylinder 20, and the brake oil inside the master cylinder 20 is discharged therefrom to provide braking force to one or more wheels (not shown).

The master cylinder 20 is approximately elongated and contains brake oil therein. The master cylinder 20 is in fluid communication with a reservoir (not shown) and at least one conduit (not shown). When the rod 10 moves linearly toward the master cylinder 20, the brake oil in the master cylinder 20 is compressed. The hydraulic pressure generated by the compression of the internal space accommodating the brake oil is transmitted to one or more wheels to brake the running vehicle.

The master cylinder 20 includes one or more first joints 22. The first joints 22 may protrude in radially outward directions from at least one surface of the master cylinder 20. However, the present disclosure is not necessarily limited thereto, and the first joints 22 may have various shapes. For example, the first joints 22 may protrude toward the gear mechanism 40 from at least one surface of the master cylinder 20.

The first joints 22 may be bolted by first bolts 61 to first protrusions 520a and 520b of the securing member 50 and third joints 42a and 42b of the gear mechanism 40. In this way, the master cylinder 20 may be fixed with the securing member 50 and the gear mechanism 40.

Meanwhile, not a sufficient braking force may be provided only by depressing the driver's brake pedal. The motor 30 and gear mechanism 40 boost the pressure applied to the master cylinder 20 to provide supplemental pressure for braking.

The motor 30 is driven with power applied. Although not shown, an electronic control unit (ECU) calculates the pressure required for braking based on the driver's pedal stroke, steering angle, vehicle speed, and yaw rate. Power is applied to the motor 30 to generate the pressure calculated by the ECU, and the motor 30 is driven.

The motor 30 includes one or more second joints 32 and one or more bosses 34.

The second joints 32 of the motor 30 may protrude from one surface thereof toward the securing member 50 and be bolted to at least some portion of the securing member 50, in particular, one or more second projections 540a and 540b thereof by second bolts 62 through the same second projections. Since the second joints 32 are fastened with the second protrusions 540a and 540b, the motor 30 and the securing member 50 may be fixed to each other.

The boss 34 may protrude toward the gear mechanism 40 from at least one surface of the motor 30. However, the present disclosure is not necessarily limited thereto, and the boss 34 may have various shapes. For example, the boss 34 may have a shape protruding radially outwardly from at least one surface of the motor 30.

The one or more bosses 34 may be bolted by third bolts 63 to one or more fourth joints 44a and 44b of the gear mechanism 40. Since the bosses 34 are fastened with the fourth joints 44a and 44b, the motor 30 and the gear mechanism 40 may be fixed to each other.

The gear mechanism 40 may provide additional pressure in addition to the pedal effort of the driver by transmitting the driving force generated by the motor 30 to the master cylinder 20. To this end, the gear mechanism 40 is connected to the master cylinder 20 and the motor 30, respectively.

At least some of the gear mechanism 40 is connected to the master cylinder 20. Meanwhile, this embodiment is illustrated that, when at least some of the gear mechanism 40 is fastened with the master cylinder 20, at least some of the master cylinder 20 is inserted into the gear mechanism 40. However, this configuration does not necessarily limit the present disclosure, and at least some of the gear mechanism 40 may be configured to be inserted into the master cylinder 20.

Some other part of the gear mechanism 40 is connected to the motor 30. Accordingly, the gear mechanism 40 may transfer the force generated from the motor 30 to the master cylinder 20. To this end, the gear mechanism 40 includes one or more gears in an accommodation space formed therein.

The gear mechanism 40 includes one or more third joints 42a and 42b (or collectively 42) and one or more fourth joints 44a and 44b (or collectively 44).

The third joint 42 protrudes in a direction corresponding to the protruding direction of the first joint 22 of the master cylinder 20. This allows the third joints 42 to be fastened with the first joints 22. Therefore, the master cylinder 20 and the gear mechanism 40 may be fixed to each other.

The fourth joints 44 of the gear mechanism 40 may be fastened with at least some of the motor 30. Thus, the motor 30 and the gear mechanism 40 can be fixed to each other.

The gear mechanism 40 may be at least partially made of synthetic resin. When made of synthetic resin, the gear mechanism 40 may be easy to form and can reduce the manufacturing cost.

The securing member 50 is fastened with the master cylinder 20, the gear mechanism 40, and the motor 30. Specifically, at least some of the securing member 50, in particular, the first protrusion 520a is disposed between and bolted to the first joint 22 and the third joint 42a by the first bolt 61.

Some other part of the securing member 50, in particular, the second protrusion 540a may be bolted to the second joint 32 of the motor 30. Since the second protrusion 540a is fastened with the second joint 32, the securing member 50 and the motor 30 may be fixed to each other.

Meanwhile, at least some of the securing member 50 may be composed of metal. When made of metal, the securing member 50 can achieve structural robustness. Further, even where the securing member 50 is exposed to the vibration generated by the motor 30 over an extended duration of time, deformation or abrasion can be prevented, resulting in an extended durability life of the electromechanical braking apparatus 1.

When the motor 30 begins to operate, vibration may occur. The vibration generated from the motor 30 may be transmitted to the gear mechanism 40 which, in turn, vibrates the master cylinder 20. When the master cylinder 20 is directly fastened to the gear mechanism 40 without an intermediate medium, vibration may lead to jolting or oscillation. A continued oscillation will compromise the durability of the respective components of the braking apparatus 1, including the motor 30 and the gear mechanism 40. Besides, noise may be generated due to vibration. Since the electromechanical braking apparatus 1 according to at least one embodiment of the present disclosure includes the securing member 50, the master cylinder 20 and the motor 30 are firmly fixed together so that the vibration and noise of the master cylinder 20 can be prevented or significantly reduced.

The following will describe in detail the shape and structure of the securing member 50.

Figure 3:
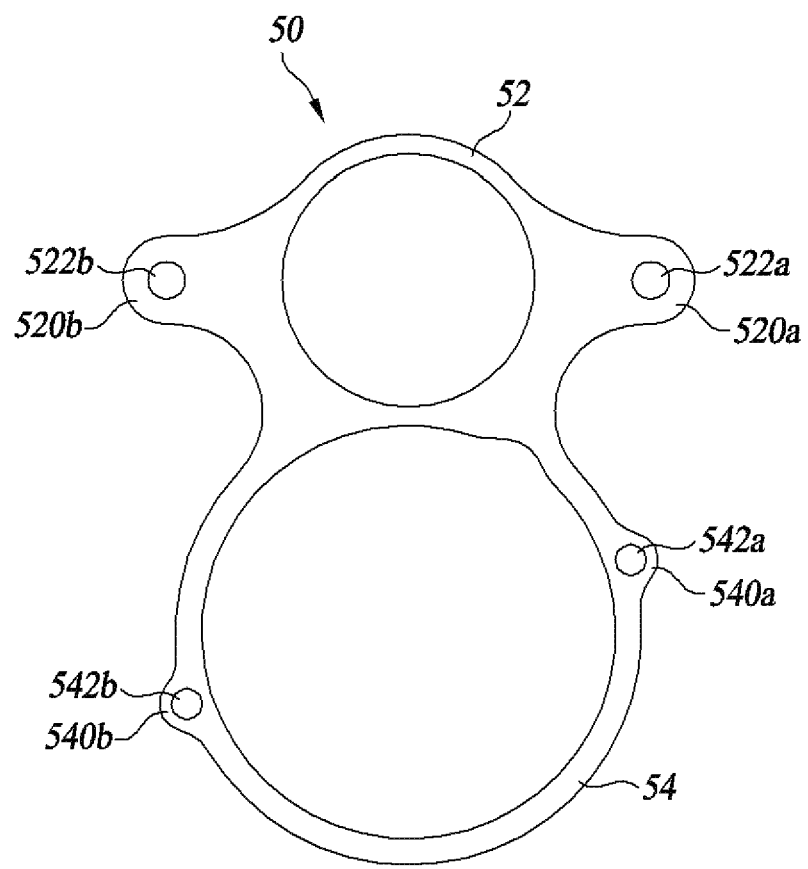
FIG. 3 is a front view of a securing member according to at least one embodiment of the present disclosure.

FIG. 3 is a front view of a securing member according to at least one embodiment of the present disclosure.

As shown in FIG. 3, the securing member 50 includes a gear-side joint 52 and a motor-side joint 54.

The gear-side joint 52 is at least partially disposed between the gear mechanism 40 and the master cylinder 20 so that it has one side that faces the gear mechanism 40 and the other side that faces the master cylinder 20. The gear-side joint 52 is configured to be fastened with at least some of the gear mechanism 40 and at least some of the master cylinder 20. The gear-side joint 52 may be formed in an approximately annular shape so that at least some of the master cylinder 20 passes therethrough. At this time, the inner circumferential surface of the gear-side joint 52 conforms to the outer circumferential surface of the master cylinder 20.

The gear-side joint 52 includes one or more first protrusions 520a and 520b.

The first protrusions 520a and 520b are disposed between the first joints 22 of the master cylinder 20 and the third joints 42a and 42b of the gear mechanism 40. Further, the first protrusions 520a and 520b are formed to be fastened with the first joints 22. For example, where the first joints 22 protrude radially outward from the outer circumferential surface of the master cylinder 20, the first protrusions 520a and 520b protrude radially outward from the outer circumferential surface of the gear-side joint 52 of the securing member 50.

The first protrusions 520a and 520b may include one or more first holes 522a and 522b. The first holes 522a and 522b are formed corresponding to the thickness of the first bolts 61 for allowing the latter to be bolted into the first holes 522a and 522b.

The motor-side joint 54 is formed adjacent to at least some of the gear-side joint 52. The motor-side joint 54 may be integrally formed with the gear-side joint 52.

The motor-side joint 54 has at least some portion that faces one surface of the motor 30 and is configured to be at least partially fastened with at least some portion of the motor 30. The motor-side joint 54 may be formed in an approximately annular shape so that a part of the motor 30 passes through the motor-side joint 54. At this time, the inner circumferential surface of the motor-side joint 54 conforms to the outer circumferential surface of the motor 30.

The motor-side joint 54 includes one or more second protrusions 540a and 540b.

The second protrusions 540a and 540b are formed to be fastened with the second joints 32 of the motor 30. To this end, the second protrusions 540a and 540b may include one or more second holes 542a and 542b. The second holes 542a and 542b are formed corresponding to the thickness of the second bolts 62 for allowing the latter to be bolted into the second holes 542a and 542b.

Meanwhile, FIG. 3 illustrates the incorporation of two first protrusions 520a and 520b and two second protrusions 540a and 540b, which, however, is merely exemplary. The first protrusions 520a and 520b and the second protrusions 540a and 540b may be appropriately configured in consideration of the shape, number, and position of the first joints 22 of the master cylinder 20 and the second joints 32 of the motor 30, respectively.

As described above, according to at least one embodiment of the present disclosure, the electric-mechanical braking apparatus is now capable of securing the improved coupling performance between the motor and the gear mechanism.

Further, at least one embodiment can reduce the noise generated from the motor, the master cylinder, and the gear mechanism.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand the scope of the claimed invention is not to be limited by the above explicitly described embodiments but by the claims and equivalents thereof.

What is claimed is:

1. An electromechanical braking apparatus, comprising:
   a rod connected to a brake pedal and configured to move when the brake pedal is depressed by a driver;
   a master cylinder coupled to the rod and configured to receive brake oil and discharge the brake oil when the rod moves;
   a motor;
   a gear mechanism unit comprising (1) a housing and (2) a gear mechanism encapsulated in the housing and coupled to the master cylinder and the motor; and
   a securing member configured to reduce a vibration generated by the motor and transferred to the master cylinder via the gear mechanism unit, the securing member comprising:
      a gear-side joint coupled between the housing of the gear mechanism unit and the master cylinder and configured to reduce the vibration transferred to the master cylinder via the gear mechanism unit; and
      a motor-side joint coupled to the motor and configured to reduce the vibration transferred from the motor to the gear mechanism box.

2. The electromechanical braking apparatus of claim 1, wherein the gear-side joint has a shape corresponding to that of an outer circumferential surface of the master cylinder, the gear-side joint having an opening through which a portion of the master cylinder extends.

3. The electromechanical braking apparatus of claim 1, wherein the motor-side joint has a shape corresponding to an outer circumferential surface of the motor, the motor-side joint having an opening through which a portion of the motor extends.

4. The electromechanical braking apparatus of claim 2, wherein the gear-side joint includes one or more first protrusions, each first protrusion protruding radially and fastened between the master cylinder and the housing of the gear mechanism unit.

5. The electromechanical braking apparatus of claim 3, wherein the motor-side joint includes one or more second protrusions, each second protrusion protruding radially and fastened to the motor.

6. The electromechanical braking apparatus of claim 1, wherein the gear mechanism comprises synthetic resin.

7. The electromechanical braking apparatus of claim 1, wherein the securing member comprises metal.

* * * * *